United States Patent
Laskar et al.

(10) Patent No.: US 11,511,640 B1
(45) Date of Patent: Nov. 29, 2022

(54) VEHICLE TO INFRASTRUCTURE AUTONOMOUS DATA BACKHAUL

(71) Applicants: Joy Laskar, Los Altos, CA (US); John Sevic, Los Gatos, CA (US); Romain Pelard, Redwood City, CA (US)

(72) Inventors: Joy Laskar, Los Altos, CA (US); John Sevic, Los Gatos, CA (US); Romain Pelard, Redwood City, CA (US)

(73) Assignee: Maja Systems, Inc., Milpitas, CA (US)

( * ) Notice: Subject to any disclaimer, the term of this patent is extended or adjusted under 35 U.S.C. 154(b) by 350 days.

(21) Appl. No.: 16/783,316

(22) Filed: Feb. 6, 2020

Related U.S. Application Data (63) Continuation-in-part of application No. 16/380,129, filed on Apr. 10, 2019, now abandoned, which is a continuation-in-part of application No. 16/129,640, filed on Sep. 12, 2018, now abandoned.

(51) Int. Cl.
| | |
|---|---|
| *B60L 53/66* | (2019.01) |
| *B60L 53/65* | (2019.01) |
| *G01C 21/34* | (2006.01) |
| *G05D 1/00* | (2006.01) |
| *G05D 1/02* | (2020.01) |
| *G07C 5/00* | (2006.01) |
| *H04W 4/44* | (2018.01) |
| *G07C 5/08* | (2006.01) |
| *H04W 4/80* | (2018.01) |

(52) U.S. Cl.
CPC ............. *B60L 53/66* (2019.02); *B60L 53/65* (2019.02); *G01C 21/3453* (2013.01); *G05D 1/0088* (2013.01); *G05D 1/0225* (2013.01); *G07C 5/008* (2013.01); *G07C 5/085* (2013.01); *H04W 4/44* (2018.02); *H04W 4/80* (2018.02)

(58) Field of Classification Search
USPC .......................................................... 701/22
See application file for complete search history.

(56) References Cited

U.S. PATENT DOCUMENTS

2018/0062420 A1\* 3/2018 Isaac ..................... H01F 27/363

\* cited by examiner

*Primary Examiner* — Tyler D Paige
(74) *Attorney, Agent, or Firm* — Useful Arts IP (57) ABSTRACT

A data transfer method for autonomous vehicles includes autonomously positioning a vehicle to achieve an alignment condition in which a vehicle-mounted directional antenna coupled to a vehicle radio is aligned with a curbside antenna coupled to a curbside radio. A peer-tip-peer radio link is established between the vehicle radio and the curbside radio, and data is transferred from the vehicle radio to the curbside radio using the peer-to-peer radio link. The peer-to-peer radio link may be a millimeter-wave radio link. Data is transferred at high speed, for example at least tens of gigabits per second or even hundreds of gigabits per second. The vehicle may be an electric vehicle, and electric charging of the vehicle may be performed while transferring the data. In one embodiment, the vehicle is configured to proceed to a recharging location when a given low state of charge is reached. Transferring data may be performed at a rate such that during recharging from the low state of charge to a target state of charge, all data to be transferred from the vehicle is transferred, or at least a terabyte of data is transferred.

27 Claims, 8 Drawing Sheets

Antenna A
Antenna B

VEHICLE TO INFRASTRUCTURE AUTONOMOUS DATA BACKHAUL

BACKGROUND

Various types of vehicles gather a huge volume of data, often tens of terabytes. Such vehicles are equipped with a broad array of sensors, including, for example, optical sensors for obstacle detection and avoidance, millimeter-wave sensors for motion and speed sensing, and acoustic sensors for proximity detection. Data gathered by these sensors may range from roughly 0.1 terabits per hour (TBh) in the case of acoustic sensors to a few TBh for optical and millimeter-wave sensors. A typical vehicle may be expected to gather roughly 12 TB of data per trip on a four-hour battery charge.

Uses of this data include refining the autonomous capabilities of such vehicles. Currently, data is transferred from vehicles to data centers by manually exchanging data storage media.

Quantities of data are also gathered by other types of vehicles, such a buses and other metropolitan service vehicles, drones, etc.

BRIEF DESCRIPTION OF THE DRAWING FIGURES

The present invention may be further understood from the following description in conjunction with the appended drawing figures. In the drawing.

DETAILED DESCRIPTION

Summary

A data transfer method for vehicles includes positioning a vehicle to achieve a condition in which a vehicle-mounted antenna coupled to a vehicle radio is brought into proximity with a fixed-location antenna coupled to a fixed-location radio. A peer-to-peer radio link is established between the vehicle radio and the fixed-location radio, and data is autonomously transferred from the vehicle radio to the fixed-location radio using the peer-to-peer radio link. The peer-to-peer radio link may be a millimeter-wave radio link. Data is transferred at high speed, for example at least one gigabit per second or even ten or tens of gigabits per second. The vehicle may be an electric vehicle, and electric charging of the vehicle may be performed while transferring the data. In one embodiment, the vehicle is configured to proceed to a recharging location when a given low state of charge is reached. Transferring data may be performed at a rate such that during recharging from the low state of charge to a target state of charge, all data to be transferred from the vehicle is transferred, or one or more terabytes of data is transferred. Transferring of data occurs at a low power level such that the vehicle radio and the fixed-location radio must be positioned within a few meters of one another. The resulting data transfer is secure, private and reliable. The vehicle radio and the fixed-location radio may be CMOS-based, resulting in a low-cost, low-power solution.

As compared to alternative data transfer technologies such as WiFi and 5G, the methods and apparatus described are private (not public), more secure, faster and currently available.

Description

The present data transfer system will be described in the context of autonomous vehicles. However, the system is equally applicable to autonomous data transfer from other types of vehicles that are not themselves autonomous, such as buses, drones, etc.

Figure 1A:
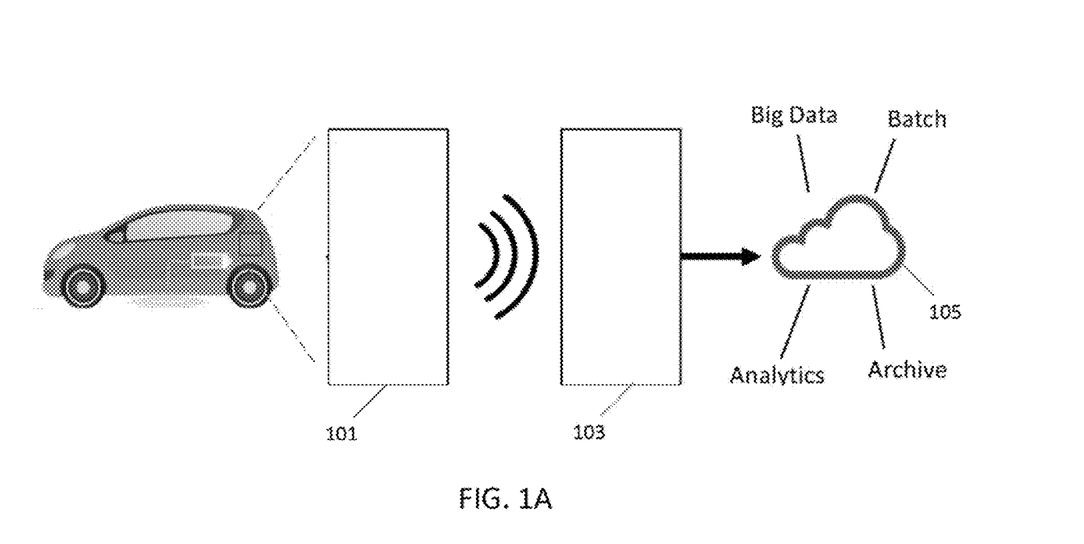
FIG. 1A is a diagram of a data transfer system.

Referring to FIG. 1A, a diagram is shown of a data transfer system for wireless autonomous data transfer. A first radio 101 is coupled over a short distance to a second radio 103, which is coupled to cloud storage 105, for example. In the case of autonomous vehicles, the first radio may be a vehicle radio and the second radio may be a fixed-location radio within a docking station. Alternatively, the second radio may be a mobile unit (mobile docking station) that comes in proximity to the vehicle, pairs with it and exchanges data with. In some instances, the docking station may be equipped with multiple radios, allowing it to support more than one connection at a time. In the case of a fixed-location docking station, for example, a cluster of parking spaces may be arranged about the docking station such that multiple vehicles may be parked in close proximity and transmit data to the same docking station at the same time.

In the cloud, data may undergo archiving, analytics, batch processing and big data-type processing, for example. In one embodiment, the first and second radios may be packaged in hermetic packages having dimensions of approximately 2"×1"×1".

In one embodiment, the first radio and the second radio may be based on a CMOS millimeter-wave radio transceiver such as the 6022 RFIC available from Maja Systems of Milpitas, Calif. The transceiver may operate in the 60 GHz range at a speed of 4-5 Gbps at a range of approximately one to two meters.

Figure 1B:
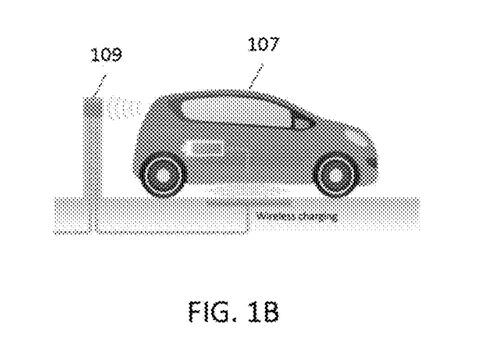
FIG. 1B is a diagram of a vehicle data autonomous backhaul system like that of FIG. 1A.

FIG. 1B is a diagram of an vehicle data autonomous backhaul system like that of FIG. 1A. In operation, an autonomous vehicle 107 autonomously backs into a charging station parking space. Adjacent the parking space is a docking station 109 that controls wireless charging and wireless data transfer. The docking station includes the fixed-location radio 103.

Figure 1C:
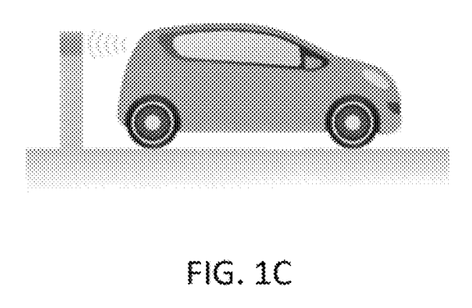
FIG. 1C is a diagram of another vehicle data autonomous backhaul system like that of FIG. 1A.
Figure 1D:
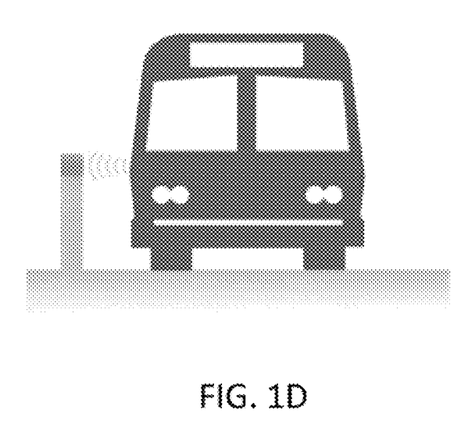
FIG. 1D is a diagram of another vehicle data autonomous backhaul system like that of FIG. 1A.

Referring to FIG. 1C and FIG. 1D, examples of autonomous backhaul for other types of vehicles are shown. The vehicle may be a generic passenger car as shown in FIG. 1C. The vehicle may be a bus as shown in FIG. 1D. The vehicle may be an aerial drone. Generally speaking, the present system may be used with any type of data-gathering vehicle.

Figure 2:
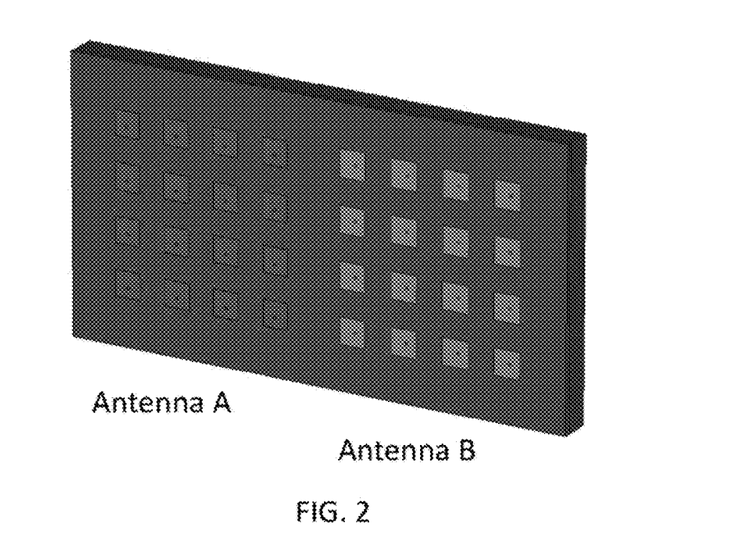
FIG. 2 is a diagram of a dual independent planar 4×4 array antenna that may be used in the system of FIG. 1.

An antenna that may be used in the data transfer system of FIG. 1A and FIG. 1B is shown in FIG. 2. In the illustrated embodiment, the antenna is a planar diversity antenna system that includes a first array of antenna elements (Antenna A) and a second array of antenna elements (Antenna B). In the illustrated embodiment, each of the antenna arrays includes a 4×4 array of antenna elements. In the system of FIG. 1, Antenna A may operate at 61 GHz, for example, and Antenna B at 62 GHz, for example. More generally, antenna A may operate at a carrier frequency f1, and antenna B at a carrier frequency f2, f1 and f2 being separated by delta f of up to few GHz, providing frequency diversity. Antenna A and B could also be operating at the same frequency.

Figure 3:
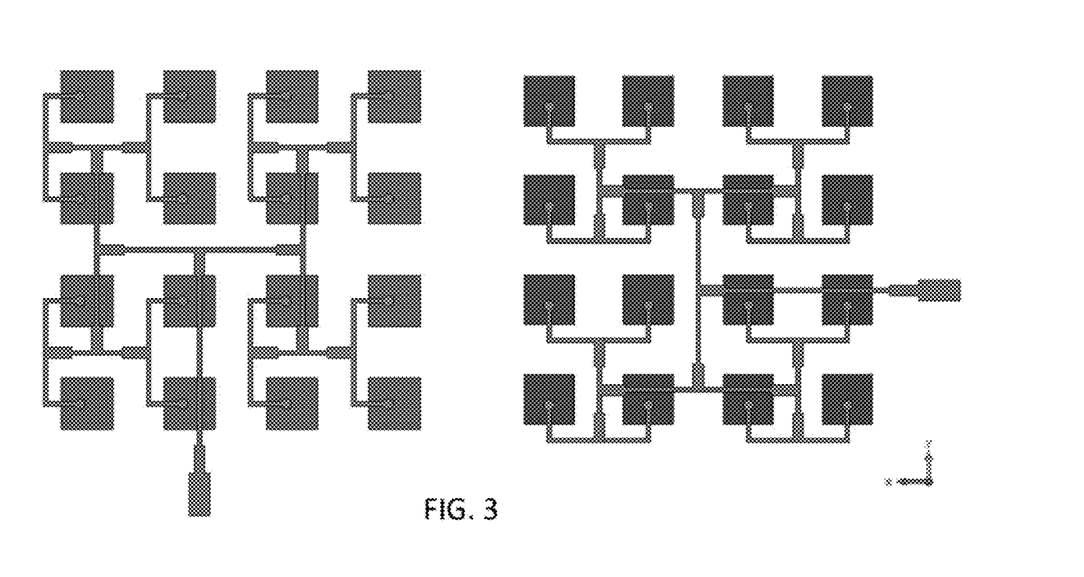
FIG. 3 is a diagram of an antenna feed structure that may be used with the antenna of FIG. 3.
Figure 4:
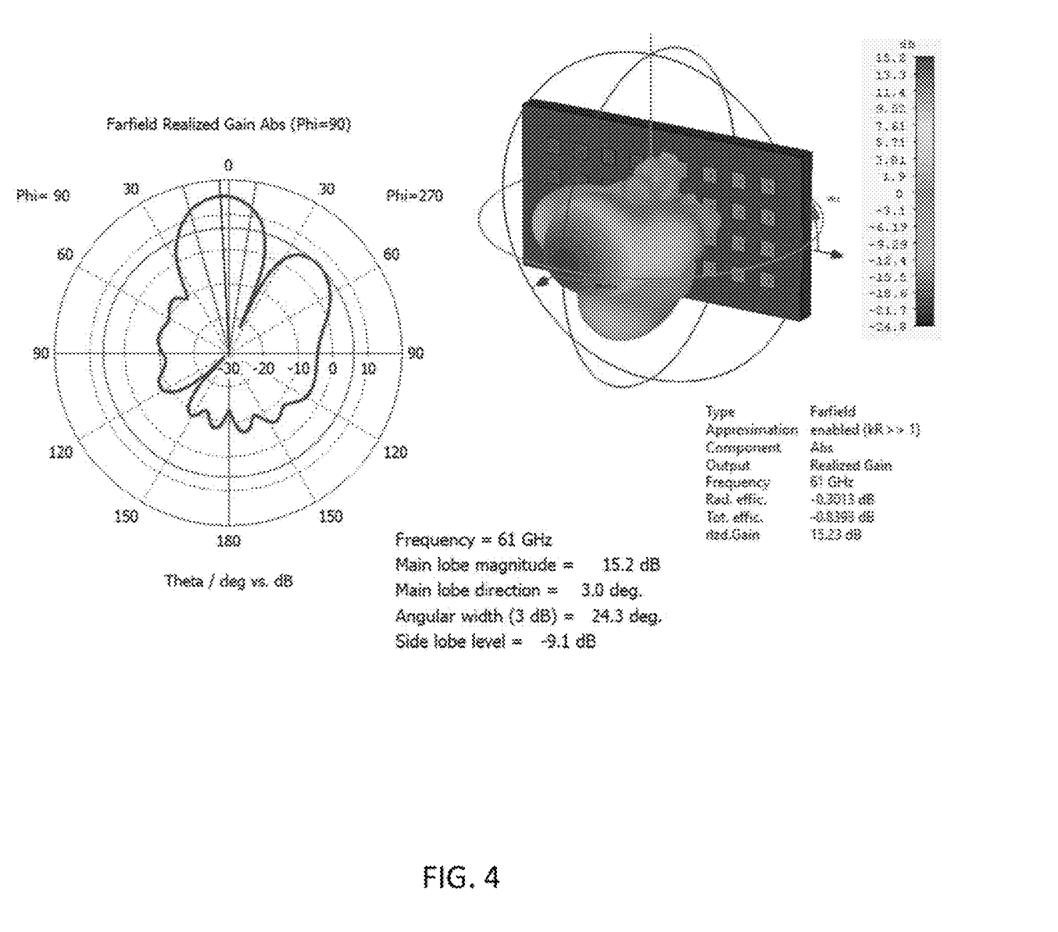
FIG. 4 is a diagram of transmission properties of Antenna A of FIG. 2 in accordance with an exemplary embodiment.
Figure 5:
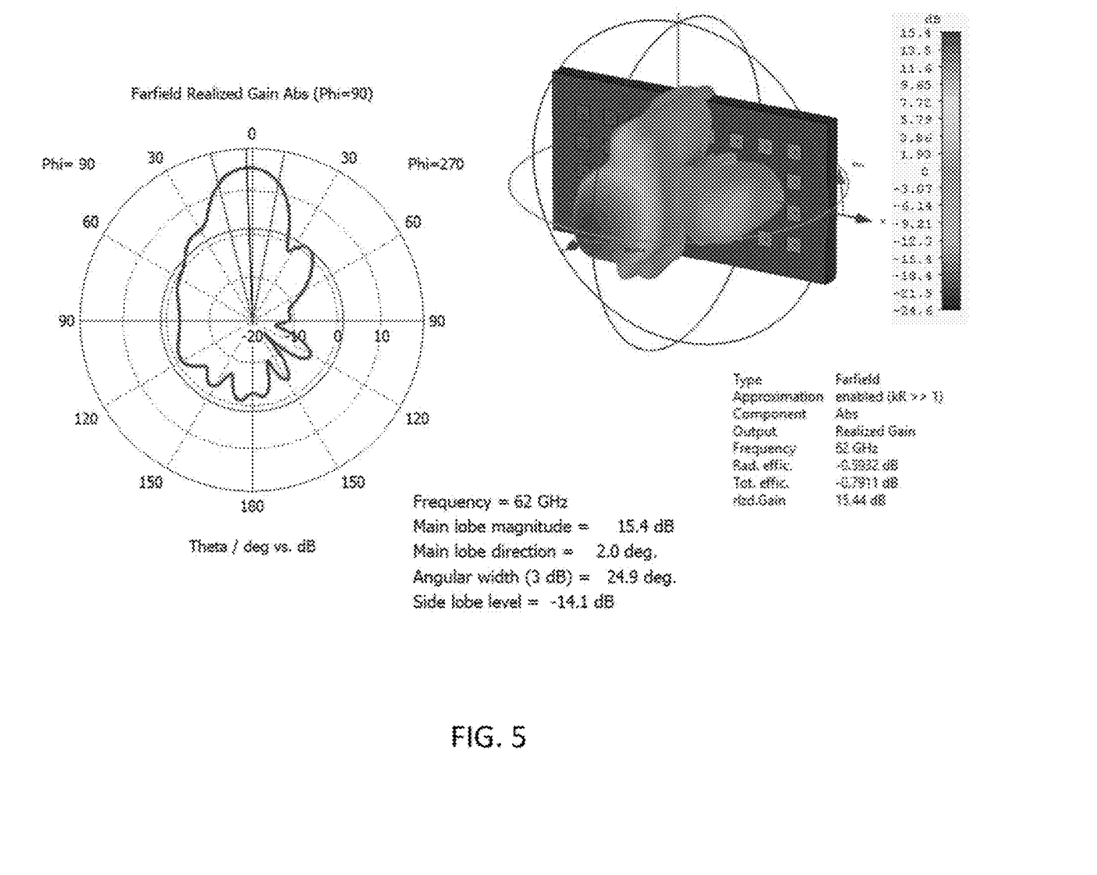
FIG. 5 is a diagram of transmission properties of Antenna B of FIG. 2 in accordance with an exemplary embodiment.

Referring to FIG. 3, a feed structure of the dual independent planar 4×4 array antenna of FIG. 2 is shown. Orthogonal polarization may be used to reduce interaction between transmissions from Antenna A and Antenna B. Transmission properties of Antenna A and Antenna B in accordance with an exemplary embodiment are shown in FIG. 4 and FIG. 5, respectively.

Figure 6:
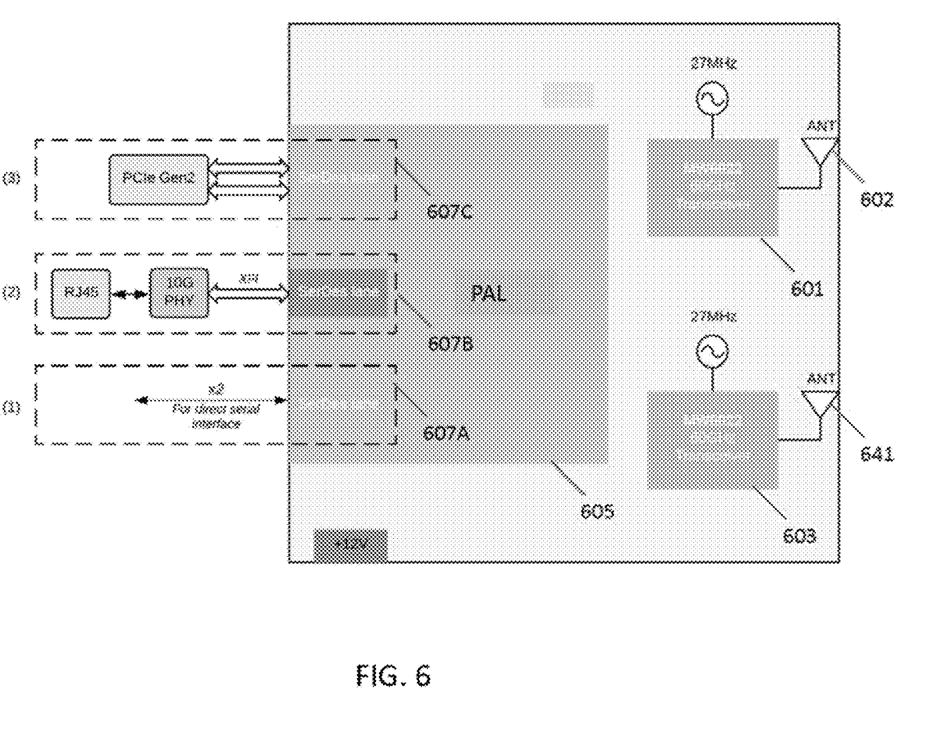
FIG. 6 is a diagram showing further details of a data transfer system like that of FIG. 1A.

Referring to FIG. 6, a diagram is shown illustrating further details of the data transfer system of FIG. 1A. A radio, suitable for use as a vehicle radio or a fixed-location or other radio to be paired with the vehicle radio, includes a first millimeter-wave (60 GHz) RFIC radio transceiver 601 and a second millimeter-wave RFIC radio transceiver 603. The first RFIC radio transceiver is coupled to a first antenna 602, and the second RFIC radio transceiver is coupled to a second antenna 604. The first and second antennas make take the form of Antenna A and Antenna B in FIG. 2.

Data interface functions are handled by a circuit board 605. Various interface options may be provided. In the illustrated embodiment, three SerDes (serial/de-serial) lanes 607A, 607B and 607C are provided. A first SerDes lane 607A may be used for direct serial interface. A second SerDes lane 607B may be used for interface using 10 GHz Ethernet (10GE). A third SerDes lane 607C may be used for interface using the PCIe standard. Of course, any combination of various known interfaces may be supported. In general, the circuit board 605 realizes a Protocol Adaptation Layer (PAL). It may also perform other functions.

Figure 7:
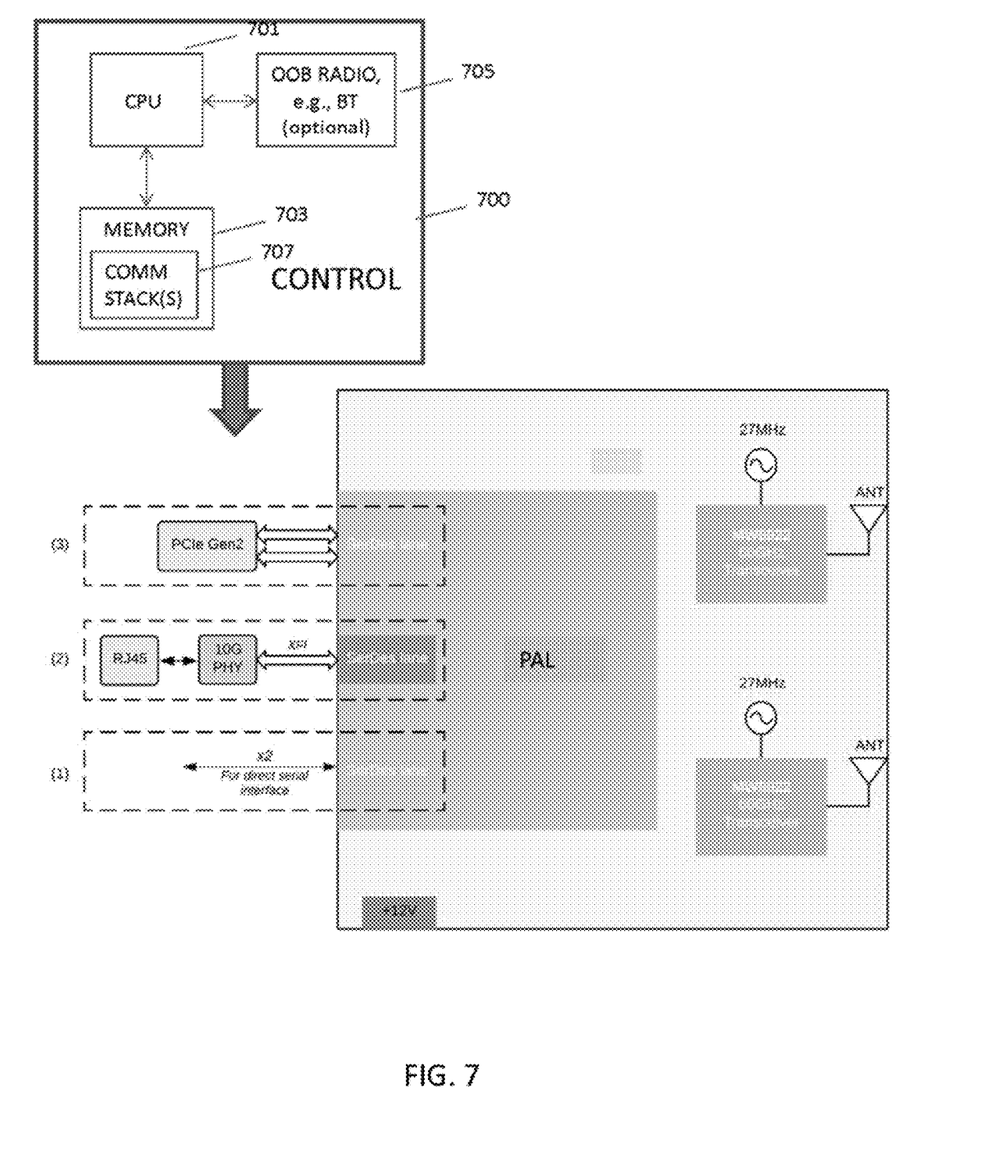
FIG. 7 is a diagram showing further details of the data transfer system of FIG. 6.

Referring to FIG. 7, a data transfer system like that of FIG. 6 is shown. In addition to the features described in relation to FIG. 6, a CPU (or MPU) controller 700 is shown, including a CPU 701, memory 703 and an optional out-of-band (00B) radio 705. The memory may store control code including, optionally, one or more communication stacks 707. In one embodiment, an 00B radio is provided in the form of a Bluetooth radio. Both the vehicle radio and the fixed-location radio may be provided with Bluetooth radios. The Bluetooth radios may be used to establish a Bluetooth (BT) link to perform a pairing function between the vehicle radio and the fixed-location radio. In this embodiment, the BT link may be used to take care of authentication, pairing, and, in some instances any kind of feedback such as alignment positioning.

Figure 8:
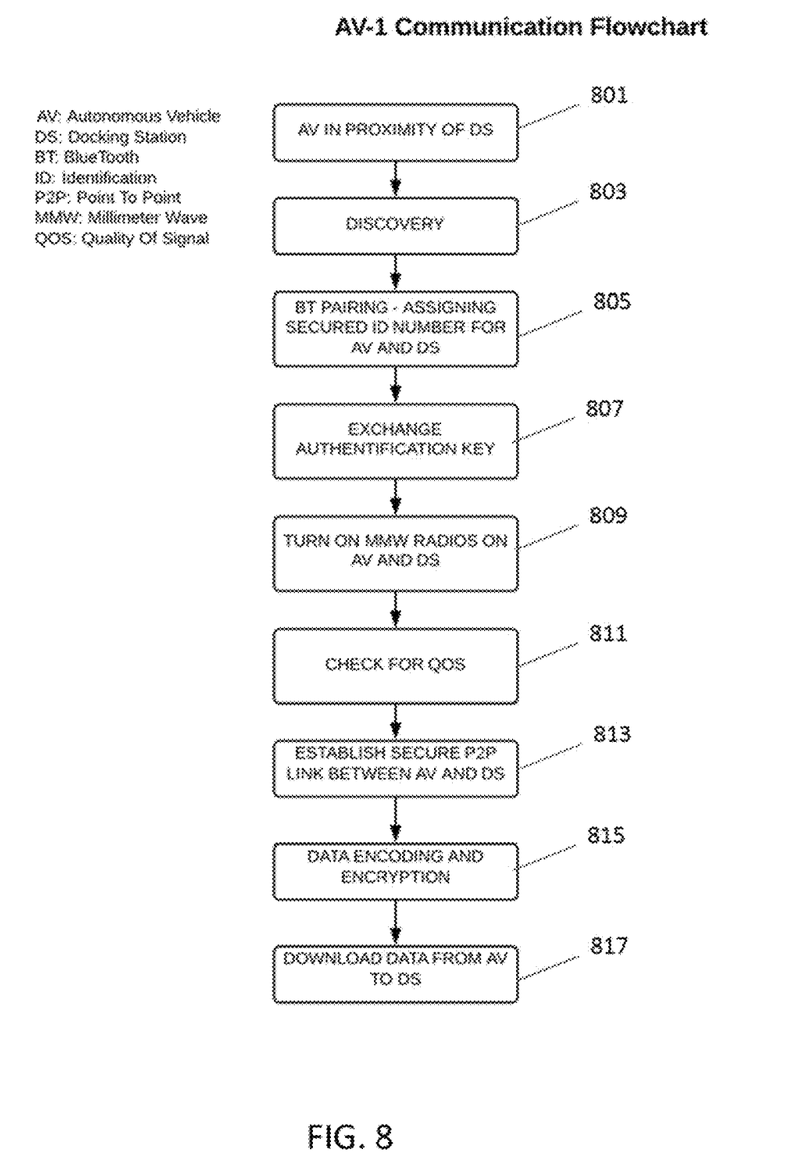
FIG. 8 is a flow diagram illustrating establishment of a communications link between the vehicle radio and the curbside radio.

Referring to FIG. 8, a flow diagram is shown illustrating establishment of a communications link between the vehicle radio and the other radio within the docking station. When the autonomous vehicle comes within proximity of the docking station (801), a discovery process begins (803). A Bluetooth pairing process then ensures (805) during which a secure ID number is assigned for the autonomous vehicle and the docking station. Authentication keys are then exchanged (807). Millimeter-wave radios at the autonomous vehicle and at the docking station (the vehicle radio and the other radio) are then turned on (809). A quality of service (QOS) check is then performed (811). Assuming acceptable link quality, a secure peer-to-peer link is then established between the autonomous vehicle and the docking station (813). A data encoding and encryption process follows (815), after which data is downloaded from the autonomous vehicle to the docking station (817).

To achieve a suitable alignment condition between the vehicle radio and the other radio for data transfer, in one embodiment, the vehicle radio and the other radio may be mounted at an identical height above grade, i.e., above a parking lot surface. The vehicle radio may be mounted at a mid-line of the vehicle. The other radio may be mounted at a mid-line of a parking space. The vehicle then autonomously parks itself in the middle of the parking space, using painted lines as a guide, for example. With the vehicle radio situated in the middle of the vehicle and the vehicle situated in the middle of the parking spot, the alignment condition is satisfied, and data transfer may proceed. That is, parking the vehicle such that the mid-line of the vehicle and the mid-line of the parking space are aligned achieves the desired alignment condition.

In other embodiments, the vehicle antenna may be configured as a steerable array antenna. In this instance, during link set-up, a steering procedure may be performed in which a steering orientation is identified that is suitable for low-power, private data transfer. The steering procedure may make use of an out-of-band link (such as Bluetooth), as previously described. In this instance, the desired alignment condition is achieved by electronic means.

In still other embodiments, pointing of at least one of the vehicle antenna and the other antenna may be achieved electro-mechanically. For example, one or both of the vehicle radio and the other radio may be mounted on a maneuverable platform that enables pointing of the respective antennas. Using information exchanged the Blue Tooth link or other out-of-band link previously described, one or both of the platforms may be maneuvered to achieve the desired alignment condition. Alternatively, the maneuverable platform may be located with a radio enclosure so as to maneuver only a circuit board on which the antenna is located. Other components within the radio enclosure may be unaffected.

It will be appreciated by those skilled in the art that the present invention may be embodied in other specific forms without departing from the spirit or essential character thereof. The disclosed embodiments are therefore intended in all respects to be illustrative and not restrictive. The scope of the invention is indicated by the appended claims rather than the foregoing description, and all changes that come within the scope and range of equivalents thereof are intended to be embraced therein.

What is claimed is:

1. A data transfer method for vehicles, comprising:
    positioning a vehicle to achieve a condition in which a vehicle-mounted antenna coupled to a vehicle radio is brought into proximity with another antenna coupled to another radio within a docking station;
    establishing a short-range peer-to-peer radio link between the vehicle radio and the other radio across a distance of a few meters or less; and
    transferring data from the vehicle radio to the other radio using the peer-to-peer radio link;
    wherein the vehicle is an autonomous vehicle, and the vehicle-mounted antenna is a vehicle-mounted directional antenna, comprising autonomously positioning a vehicle to achieve an alignment condition in which the vehicle-mounted directional antenna is aligned with a fixed-location antenna coupled to the docking station.

2. The method of claim 1, wherein the peer-to-peer radio link is a millimeter-wave radio link.

3. The method of claim 1, comprising transferring the data at a speed of at least one gigabit per second.

4. The method of claim 1, comprising transferring the data at a speed of at least ten gigabits per second.

5. The method of claim 1, comprising transferring at least 0.1 terabytes of data.

6. The method of claim 1, wherein the vehicle is an electric vehicle, comprising performing electric charging of the vehicle while transferring the data.

7. The method of claim 6, wherein the vehicle is configured to proceed to a recharging location when a given low state of charge is reached.

8. The method of claim 7, wherein transferring data occurs at a rate such that during recharging from the low state of charge to a target state of charge, all data to be transferred from the vehicle is transferred.

9. The method of claim 7, wherein transferring data occurs at a rate such that during recharging from the low state of charge to a target state of charge, at least a terabyte of data is transferred.

10. The method of claim 1, wherein the vehicle radio and the other radio are CMOS-based.

11. The method of claim 1, comprising achieving the alignment condition by:
situating the vehicle radio and the other radio at an identical height above grade;
situating the vehicle radio at a mid-line of the vehicle; and
situating the other radio at a mid-line of a parking space; and
parking the vehicle such that the mid-line of the vehicle and the mid-line of the parking space are aligned.

12. The method of claim 1, comprising achieving the alignment condition by electromechanically pointing at least one of the vehicle antenna and the other antenna.

13. The method of claim 1, comprising achieving the alignment condition using beam steeling of the vehicle antenna.

14. The method of claim 1, wherein each of the vehicle radio and the other radio are provided with a Bluetooth radio, comprising:
establishing a Bluetooth link; and
using the Bluetooth link to perform authentication and pairing.

15. A data transfer method for vehicles, comprising:
achieving a condition in which a vehicle-mounted antenna coupled to a vehicle radio is brought into proximity with another antenna coupled to another radio within a docking station;
establishing a short-range peer-to-peer radio link between the vehicle radio and the other radio across a distance of a few meters or less; and
transferring data from the vehicle radio to the other radio using the peer-to-peer radio link;
wherein the vehicle is an autonomous vehicle, and the vehicle-mounted antenna is a vehicle-mounted directional antenna, comprising autonomously positioning a mobile docking station to achieve an alignment condition in which the vehicle-mounted directional antenna is aligned with an antenna coupled to the docking station.

16. The method of claim 15, wherein the peer-to-peer radio link is a millimeter-wave radio link.

17. The method of claim 15, comprising transferring the data at a speed of at least one gigabit per second.

18. The method of claim 15, comprising transferring the data at a speed of at least ten gigabits per second.

19. The method of claim 15, comprising transferring at least 0.1 terabytes of data.

20. The method of claim 15, wherein the vehicle is an electric vehicle, comprising performing electric charging of the vehicle while transferring the data.

21. The method of claim 20, wherein the vehicle is configured to proceed to a recharging location when a given low state of charge is reached.

22. The method of claim 21, wherein transferring data occurs at a rate such that during recharging from the low state of charge to a target state of charge, all data to be transferred from the vehicle is transferred.

23. The method of claim 21, wherein transferring data occurs at a rate such that during recharging from the low state of charge to a target state of charge, at least a terabyte of data is transferred.

24. The method of claim 15, wherein the vehicle radio and the other radio are CMOS-based.

25. The method of claim 15, comprising achieving the alignment condition by electromechanically pointing at least one of the vehicle antenna and the other antenna.

26. The method of claim 15, comprising achieving the alignment condition using beam steering of the vehicle antenna.

27. The method of claim 15, wherein each of the vehicle radio and the other radio are provided with a Bluetooth radio, comprising:
establishing a Bluetooth link; and
using the Bluetooth link to perform authentication and pairing.

* * * * *